United States Patent [19]
Liu

[11] Patent Number: 5,814,973
[45] Date of Patent: Sep. 29, 1998

[54] POWER UNIT AND CHARGER FOR A BATTERY POWERED ELECTRICAL APPARATUS AND METHOD

[75] Inventor: Jiewen Liu, Cary, N.C.

[73] Assignee: Ericsson Inc., Research Triangle Park, N.C.

[21] Appl. No.: 717,098

[22] Filed: Sep. 20, 1996

[51] Int. Cl.⁶ .................................................. H01M 10/46
[52] U.S. Cl. .......................................... 320/137; 320/141
[58] Field of Search .................................. 320/9, 13, 19, 320/21, 22, 32, 137, 139, 141, 142, 143, 145; 307/66

[56] References Cited

U.S. PATENT DOCUMENTS

| | | |
|---|---|---|
| 4,641,078 | 2/1987 | Short . |
| 5,523,671 | 6/1996 | Stewart ................................. 320/21 X |
| 5,530,335 | 6/1996 | Decker et al. ............................... 320/5 |
| 5,539,298 | 7/1996 | Perkins . |
| 5,561,361 | 10/1996 | Sengupta et al. ......................... 320/14 |
| 5,600,227 | 2/1997 | Smalley .................................... 320/21 |

OTHER PUBLICATIONS

Patent Abstracts of Japan, vol. 012, No. 030 (E–578), 28 Jan. 1988 & JP 62 185559 A (Canon Inc.), 13 Aug. 1987, See Abstract.

*Primary Examiner*—Edward Tso
*Attorney, Agent, or Firm*—Nixon & Vanderhye PC

[57] ABSTRACT

A unified battery charge method allows for controlling constant as well as time varying current sources. Unlike the charging method used for a constant current source, the input current of a time varying current source must be checked continuously during the charging process. The amount of current output to charge the battery or to supply the phone power is set to a desired value by selecting duty-percentage based upon the input current measurement. A unified formula for different power sources and various required current improves the preferred output current computation. Thus, the unified formula can be used to control input and output currents regardless of whether a constant current source or a time varying current source is used. In order to obtain smoother current average, the method incorporates an adjustable time period, which is determined based on the difference between an input current and a desired output current.

12 Claims, 5 Drawing Sheets

POWER UNIT AND CHARGER FOR A BATTERY POWERED ELECTRICAL APPARATUS AND METHOD

BACKGROUND OF THE INVENTION

The present invention relates generally to electrical apparatus powered by rechargeable batteries and, more particularly, to a power and charging unit and method for electrical apparatus operation and battery charging with varying current power sources.

In an electrical device such as a cellular phone, a battery is typically the power supply for the device. A phone battery, for example, is charged by connecting the phone to an external power supply called a charger. Typically, the charging process is controlled by software resided in the phone.

The structure and method according to the present invention extend the current control method from a constant current source to a time varying current source, which is required in new products. That is, the conventional constant current source is expensive to manufacture, and in order to reduce manufacturing costs, new products include a significantly less expensive charger providing a time varying current. The invention utilizes a new method to control phone battery charging and operation with the variable current. The method exploits an improved unified current control formula for both battery charge and power supply with varying power sources. A varying time period is also proposed to smooth average output current.

Previously, chargers for cellular phones provided constant current sources. The phone battery could be charged directly by connecting a charger to the phone without any current control. When supplying current to a phone, a formula was used to calculate a duty cycle, which is a percentage of charge current ($I_{charge}$) switching to ON over a regular time period T. Therefore, the average amount of current ($I_{phone}$) over this time period is equal to the preferred phone current.

$$\text{duty-cycle} = (I_{phone}/I_{charge}) \times T \tag{1}$$

For a constant current source $I_{charge}$ is a constant and $I_{phone}$ is a constant corresponding to phone power levels. The duty-cycle is thus a constant as well at each power level.

Standard chargers are simple AC/DC adapters that connect the phones directly to a wall outlet via the phones' system connector. The standard chargers provide an unfiltered and unregulated output current using a traditional transformer and a full-bridge rectifying device to convert 110V (or 220V) alternating current (AC) to 6V direct current (DC). The amount of the output current of a standard charger varies based on time and the voltage across its load. Generally, the output current is a full-wave with amplitude from 0 to 1.5 A in 120 Hz (or 100 Hz) and average value around 700 mA. The charger's load voltage in this case is typically the battery voltage. The lower the load voltage is, the higher the output current will be, and vice versa.

When a time varying current source is used to charge a battery, the phone battery cannot be charged by simply driving the charge current. The input charge current must be measured continuously. Therefore, the conventional battery charging method using a constant current source is no longer appropriate, and a new method is necessary to generate a preferred charge current over a time period.

SUMMARY OF THE INVENTION

In accordance with the invention, a unified battery charge method is provided to allow for controlling constant current sources as well as time varying current sources. Unlike the charging method used for a constant current source, the input current of a time varying current source must be checked continuously during the charging process. The amount of current output to charge the battery or to supply the phone power can be set to different desired values by selecting a different duty-percentage based on the input current measurement. To improve the preferred output current computation, a unified formula for different power sources ($I_{input}$) and various desired currents ($I_{out-des}$) is provided in accordance with a predetermined relation. The advantage of this method is that the computation method for controlling current to the phone is accurate regardless of whether the current source is constant or time varying. With charging the phone battery, $I_{out-des}$ is the amount of current desired for charging the battery. When supplying the phone power, $I_{out-des}$ is the amount of current desired to operate the phone in different operation modes. When using a constant power source, $I_{input}$ is a constant value from the external power source. When using a time varying power source, $I_{input}$ varies and must be measured at all times. For all combined situations, the different desired output currents can be attained by changing the duty percentage within a time period.

In accordance with another aspect of the invention, an adjustable time period t is proposed to obtain a smoother current average, which improves charge effectiveness. In some instances, for example, when the input current is much greater than the desired current, the duty-percentage would have to be reduced significantly such that the current would be applied with a short pulse. Since the duty-percentage is a percentage of charge current ($I_{input}$) switching to ON over a regular time period T, the short pulse crates a long time interval in which the charging current is switched to OFF. Such an intermittent charging process is not smooth and therefore not desirable. For the time varying current source, the difference between the desired output current and the input current is also time varying. If a fixed time period is used, the larger the difference is, the poorer the average result will be. The time period t can thus be modified based on the difference between $I_{input}$ and $I_{out-des}$. When this difference is less than 0 (i.e., $I_{input} < I_{out-des}$), the time period continues to expand until the $\Delta I$ changes sign.

In an exemplary embodiment, the method according to the present invention includes (a) measuring an input current ($I_{input}$) from the current source, (b) selecting a desired output current ($I_{out-des}$) in accordance with predetermined operating parameters, (c) determining a duty cycle in accordance with $I_{input}$ and $I_{out-des}$, and (d) supplying power ($I_{output}$) to the electrical apparatus in accordance with the duty cycle. Step (b) may be practiced by selecting $I_{out-des}$ in accordance with a battery charging operation, and step (d) may be practiced by supplying power to charge the battery. The duty cycle is a product of a duty percentage and a time period. In this regard, step (c) is practiced by varying the duty percentage over the time period. In an alternative process, the time period is a function of ($I_{input} - I_{out-des}$) and step (c) is practiced by varying the time period.

Step (b) may be practiced by determining whether the battery needs charging, and if so, setting $I_{out-des}$ to a battery charging current ($I_{battery}$). In this regard, if the battery does not need charging, step (b) may be practiced by setting $I_{out-des}$ to a device operating current ($I_{device}$).

In another exemplary embodiment according to the invention, there is provided a power unit for a battery powered electrical apparatus. The power unit is coupleable to one of a constant current source and a time varying current source. The power unit includes an A/D converter that monitors the input current ($I_{input}$) from the current source, a memory storing desired output currents ($I_{out-des}$) corresponding to predetermined operating parameters, and a controller that determines a duty-percentage in accordance with $I_{input}$ and $I_{out-des}$, wherein the controller controls a switch to drive the input current ($I_{input}$) to the electrical apparatus in accordance with the duty cycle. The power unit may further include a rechargeable battery coupled with the electrical apparatus for powering the electrical apparatus when the current source is disconnected.

The power unit may further comprise a charging circuit communicating with the controller, wherein the controller closes the charging circuit to charge the battery in accordance with one of the predetermined parameters. The predetermined parameters preferably comprise at least a charging mode and a device operating mode. In this regard, when the device is in the charging mode, the controller sets $I_{out-des}$ to a battery charging current ($I_{battery}$), and when the device is in the device operating mode, the controller sets $I_{out-des}$ to a device operating current ($I_{device}$).

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
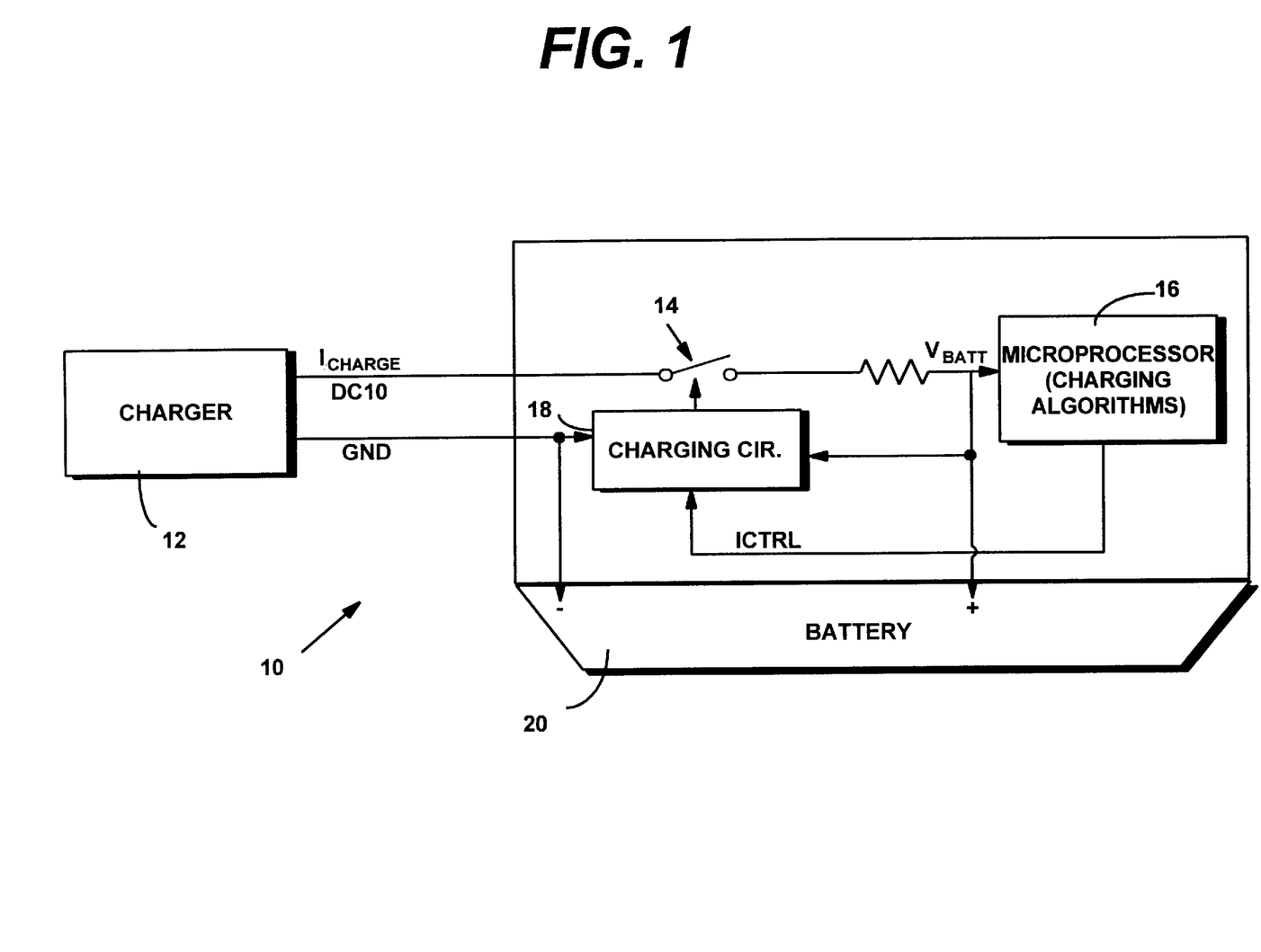
FIG. 1 is a block diagram illustrating the power unit according to the present invention.

FIG. 1 is a block diagram illustrating the power unit structure according to the present invention. The power unit 10 includes a charger 12 that is connected with an AC power source such as a wall outlet. The input current $I_{ch}$ flows toward a switch 14 that is opened and closed based on a signal ICTRL from a microprocessor 16. The microprocessor controls the switch 14 via a charging circuit 18 in accordance with the control algorithm of the present invention. The microprocessor 16 accesses an EEPROM that stores desired output currents ($I_{out-des}$) for charging and operating parameters of the phone. The EEPROM also stores other variables in accordance with the following table:

| CONDITION LEVELS | VALUES | DEFINITIONS |
| --- | --- | --- |
| Phone power Off level (max.) | 6.8 V | Power Off level in handheld set |
| Phone power Off level (min.) | 4.2 V | Power Off level in handheld set |
| Battery maximum level | 6.5 V | Maximum battery voltage during charging |
| Battery first full level | 6.0 V | Battery full |

-continued

| CONDITION LEVELS | VALUES | DEFINITIONS |
| --- | --- | --- |
| | | level before charging |
| Battery full level | 5.6 V | Full level for a 4-cell battery |
| High level of TX On | 5.3 V | Battery high in conv. mode during charging |
| Low level of TX On | 4.5 V | Battery low in conv. mode during charging |
| Battery recharge level of TX Off | 5.2 V | Recharging battery in standby mode |
| Battery recharge level of TX On | 4.8 V | Recharging battery in conversation mode |
| Low battery warning level of standby | 4.5 V | Battery low level in standby mode |
| Low battery warning level of TX On | 4.4 V | Battery low level in conversation mode |
| Charge current max limit | 1.5 A | Maximum charge input current |
| Battery charging current level | 0.7 A | Current required for changing a battery |
| Rapid charger reference level | 0.5 A | Current level to distinguish charger types |
| Charge current threshold level | 0.1 A | Minimum charge input current |
| High limit of charging temperature | 48° C. | High limit for stopping charge |
| Low limit of charging temperature | 5° C. | Low limit for stopping charging |
| High reference of charging temperature | 40° C. | High point of temperature range for charging |
| Low reference of charging temperature | 10° C. | Low point of temperature range for charging |
| Minus delta V | 2 | Number of A/D reading for -dV detection |
| Minus delta V counter | 2 | Number of consecutive cycles for -dV detection |
| Peak voltage counter | 10 minutes | Time for peak detection |
| Safety timer of rapid charger | 4 hours | Maximum charging time for rapid charger |
| Safety timer of basic charger | 8 hours | Maximum charging time for basic charger |

The device battery 20 receives the input current $I_{battery}$ for charging the battery when the power unit is in the charging mode and the switch 14 is closed.

Figure 2:
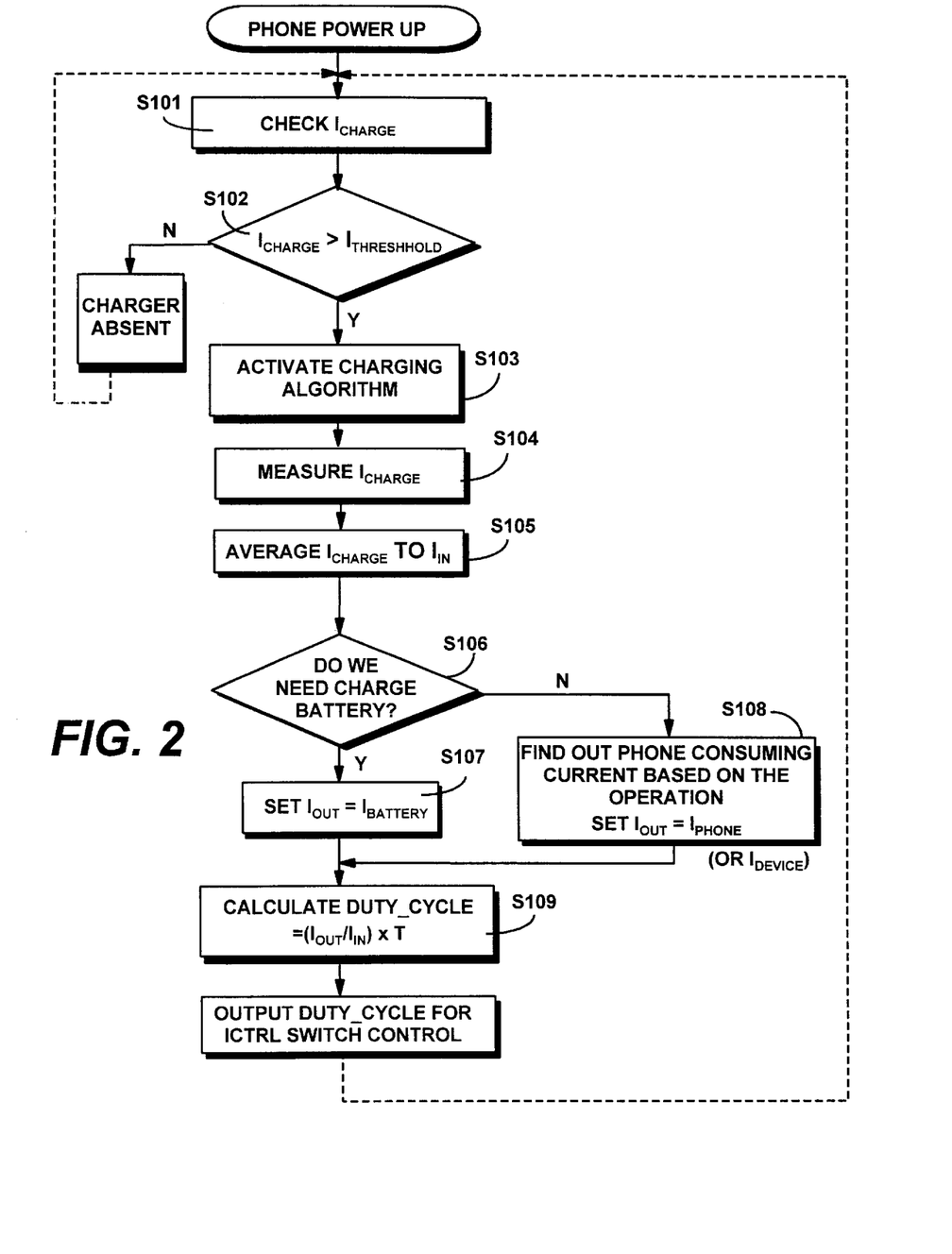
FIG. 2 is a flow chart illustrating a process carried out by the microprocessor of the power unit.

The algorithm carried out by the structure according to the present invention will be described with reference to FIG. 2. For the sake of description, a cellular phone is described as the electronic device, although the invention is applicable to other electronic devices, and the invention is not meant to be limited to a cellular phone.

When a charger is connected to a phone (with a battery), a charging cycle is initiated. The charging function can be performed either when a phone is ON with full service or OFF. The charging current is always modulated by controlling the charging switch ICTRL during a charging cycle. The amount of current supplied to the phone or battery depends on different operating modes and the battery voltage.

A charger connection is detected by sensing the charge current in step S101. This current will be sensed every second by switching the ICTRL to ON and reading the current output from the charger through the charging circuit. A charger is detected if the average current value is higher than the charge current threshold level (step S102).

If a charger is detected, the charging algorithm is activated in step S103. As noted above, unlike the conventional charging method used for a constant current source, the input current of a time varying current source must be checked continuously during the charging process (step S104). The input current $I_{charge}$ is then averaged to $I_{input}$ in step S105. That is, the charge current must be read while the ICTRL is ON, and the current output from a standard AC/DC charger is 120 HZ full waves. Considering that in one standard rapid charger, there exists a 4700 uF capacitor, which will cause a long transition time whenever the ICTRL changes, the current is measured every five seconds by taking ten samples in eight ms after setting the ICTRL ON for 50 ms. A new current reading is a mean value of the 10 samples. The $I_{input}$ is then calculated using a filtering average by adding the new current reading and the previous $I_{input}$ together with weight 1/32 and 31/32 respectively.

Figure 3:
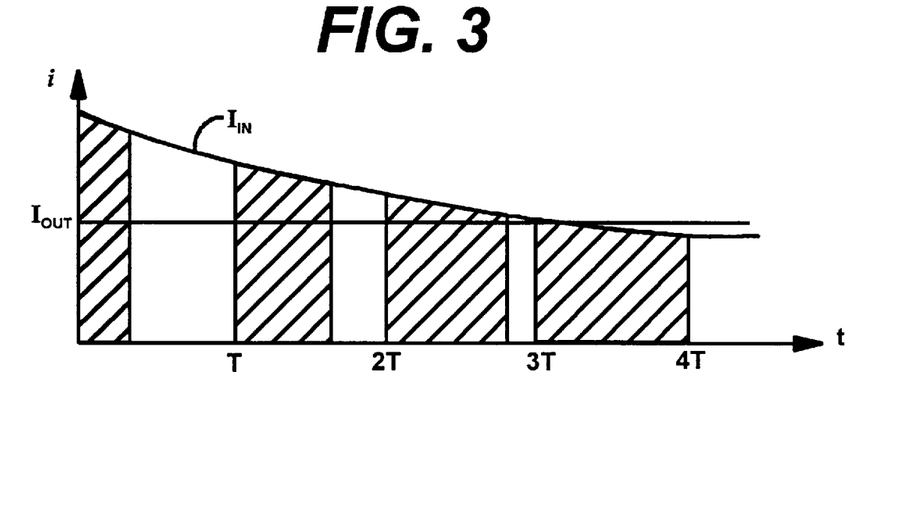
FIG. 3 is a current control graph showing $I_{input}$ and $I_{out-des}$ vs. time.

It is next determined in step S106 whether the battery needs charging. If so (YES in step S106), the microprocessor proceeds to step S107. If not (NO in step S106), the microprocessor proceeds to step S108. In steps S107 and S108, the current necessary for charging the battery or to operate the phone, respectively, is set as the desired output current $I_{out-des}$ based on the operating modes. The amount of current output to charge the battery or to supply the phone power is set to a desired value by the microprocessor by selecting a different duty-percentage based on the input current measurement (see FIG. 3). A unified formula for different power sources ($I_{input}$) and various required currents ($I_{out-des}$) is provided as follows:

$$I_{out-des} = I_{input} \times \text{duty-percentage} \quad (2)$$

and $$\text{duty-cycle} = \text{duty-percentage} \times T \quad (3)$$

where T is the time period for obtaining average current $I_{out-des}$. As noted above, an advantage of the unified formula is that no matter what kind of current source is utilized, constant or time varying, formula (2) can always be used as a common computation method. When charging the phone battery, $I_{out-des}$ is the amount of current required for charging the battery, and when supplying the phone power, $I_{out-des}$ is the amount of current to compensate the phone current consumed in different operation modes. When using a constant power source, $I_{input}$ is a constant value from the external power source. When using a time varying power source, $I_{input}$ is varying and must be measured all the time. For all combined situations, different output currents can be observed by changing the duty-percentage within a time period. FIG. 3 illustrates the current control using formulas (2) and (3) for both battery charging and phone power supplying. Note that, for a specified output current $I_{out-des}$, the duty percentage increases as the input current $I_{input}$ decreases.

In step S109, the duty cycle is calculated in accordance with $I_{input}$ and $I_{out-des}$ based on formulas (2) and (3) such that:

$$\text{duty-cycle} = (I_{out-des}/I_{input}) \times T \quad (4)$$

The duty-cycle is then output for the ICTRL switch ON or OFF control, and the power ($I_{output}$) is supplied to the electrical apparatus in accordance with the determined duty-cycle. In order to reduce the computational burden of the microprocessor, duty-cycles may be pre-calculated and stored in tables in the EEPROM. The microprocessor accesses the corresponding table and picks up the duty-cycle according to the input current $I_{input}$ and the desired output current $I_{out-des}$.

The duty-cycle is set to 100% if $I_{input}$ is lower than $I_{out-des}$. Otherwise the duty-cycle is calculated using the formula above. In a special case, when the transmitter is ON and the battery voltage is above 5.3V, the ICTRL will be set to low for the rest of the time period to protect the phone from internal overheating.

During the duty-cycle ON, there may be short ICTRL-low pulses for the battery voltage measurement. During the ICTRL OFF ($t_p$-(duty-cycle)), there may be short ICTRL-high pulses for charger connection detecting.

Figure 4:
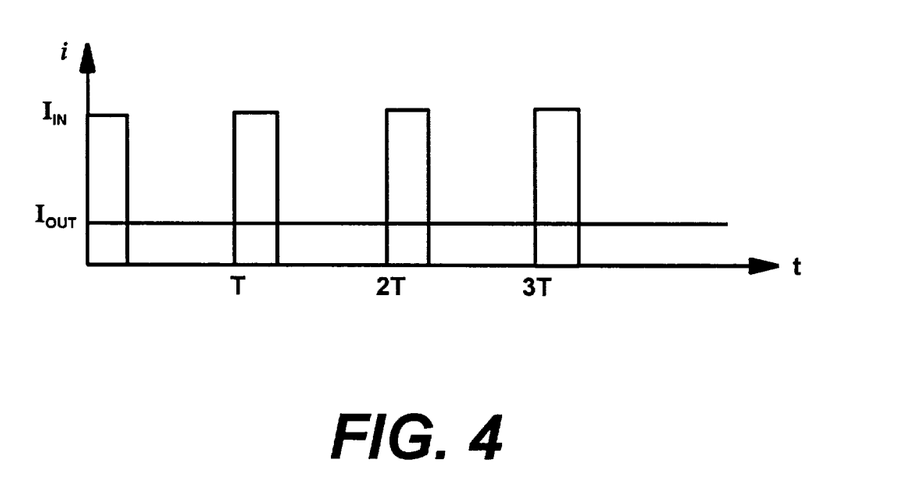
FIG. 4 is a graph illustrating average output current when $I_{input} >> I_{out-des}$.

Smoother current averages can be obtained utilizing an adjustable time period T. Since the input current is time varying, the difference between the output current and the input current is also time varying. If a fixed time period is used, the larger the difference is, the poorer the average result will be (see FIG. 4).

Let t be a variable time period to be used for current averaging, the duty-cycle in formula (3) then becomes duty-cycle=duty-percentage×t. In this formula, the time period t is modified based on the difference between $I_{input}$ and $I_{out-des}$. In general, t can be expressed as a function of $\Delta I$ $$t = f(\Delta I) = f(I_{input} - I_{out-des}) \quad (5)$$

Figure 5A:
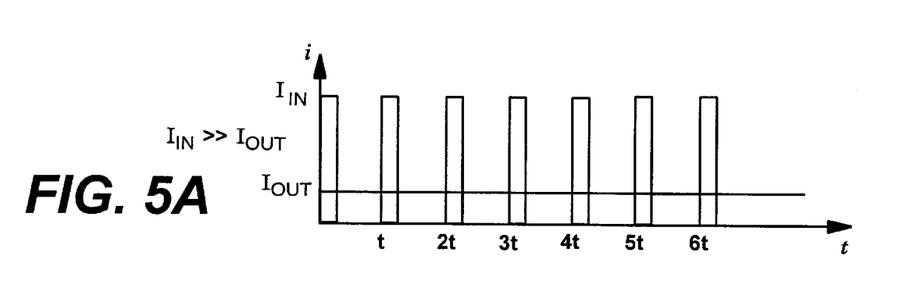
FIGS. 5A–5C are graphs illustrating current control using varying time periods.
Figure 5B:
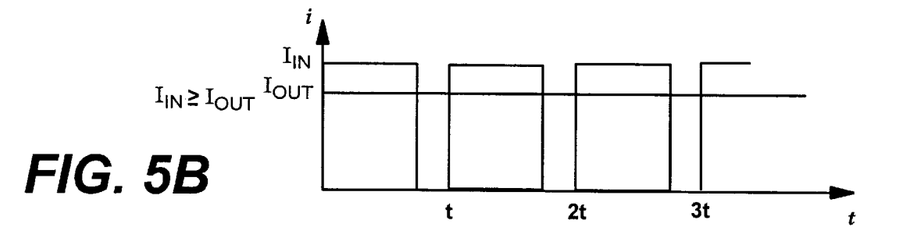
Figure 5C:
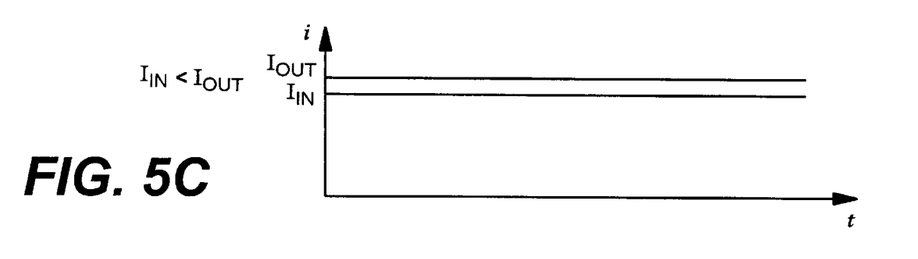

When the $\Delta I$ is increasing, the time period T is reduced and vice versa. When $\Delta I$ is less than zero ($I_{input} < I_{out-des}$), the time period continues to expand until the $\Delta I$ changes sign. FIGS. 5A–5C show the smooth averaged output current using a varying time period calculated in formula (5).

Figure 6:
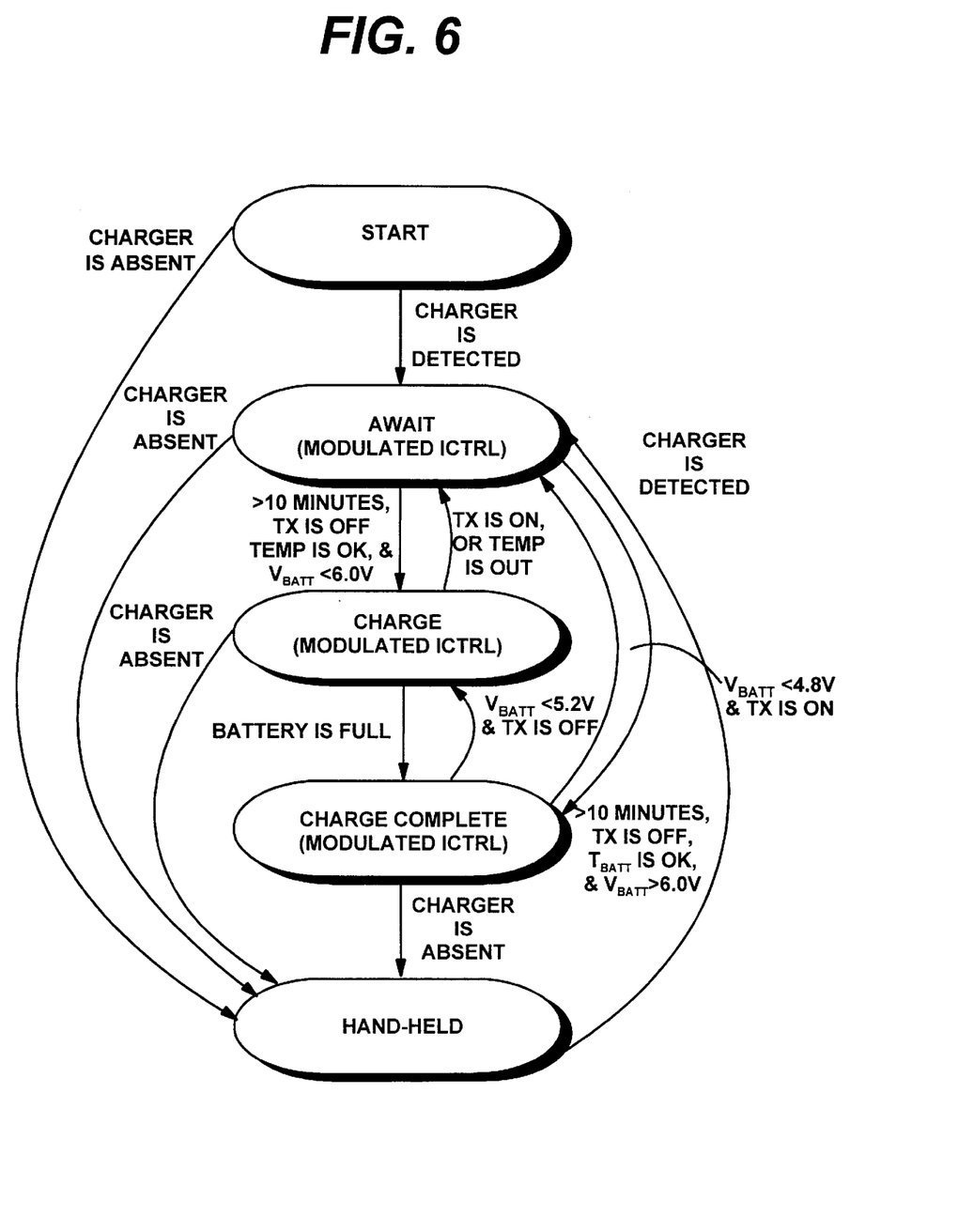
FIG. 6 is a state machine diagram according to the invention.

FIG. 6 is a state machine diagram for the algorithm according to the invention. When a phone is powered up by either a battery or an external power source, the charging algorithm enters a Start state, in which all the parameters associated with the algorithm are initialized. A 10-minute start timer is activated to allow the phone to attain the battery temperature. The phone starts to check the charger connections constantly and identifies the type of power source being supplied to the phone. If no charger is detected, the phone is powered by a battery, and the algorithm goes to the Hand-held state, in which charging is inactive and the phone operates as a hand held set.

Whenever a charger is detected, charging is activated and the state is changed from the Hand-held state to the Await state. The Await state is an analyzing state of the charging algorithm. In the Await state, the microprocessor checks all the charging requirements to ensure that the battery is charged in a safe situation. The requirements include: (1) the start timer has expired, (2) the transmitter is Off, (3) the phone is not accessing system or scanning channels, (4) the battery temperature is within the range for charging, and (5) the battery voltage is below the "first full" level. If all the requirements are satisfied, the algorithm is switched to the Charging state. Otherwise, the algorithm stays in the Await state and maintains the battery. If the battery voltage is detected above the "first full" level before charging, the algorithm enters the Charge Complete state directly to avoid overcharging a full battery.

In the Charging state, the battery is charged with the charge current from the power unit. During charging, some requirements, such as transmitter's situations, battery temperature, and phone operating modes, are monitored constantly. If any one of those requirements reaches an unacceptable level, the algorithm returns to the Await state. Otherwise, the battery is continually charged until the battery full level is reached. Four conditions are used to determine when a battery has been fully charged: (1) minus delta V detection, (2) peak voltage detection, (3) maximum battery voltage, and (4) safety timer limitations. If any one of the conditions is met, the Charging state is terminated. The algorithm is then switched to the Charge Complete state and battery full is declared.

In the Charge Complete state, the algorithm maintains the fully charged battery with modulated charge current. A click-out function is enabled to protect the battery from recharging within a short time. The requirements checked in the Await state are also examined in the Charge Complete state. The algorithm returns to the Charging state to recharge the battery if voltage drops below the standby recharge level in the standby mode. If battery voltage drops to the conversation recharge level in the conversation mode, the algorithm returns to the Await state and then to the Charging state when the transmitter is Off.

If no charger has been detected for 3 seconds during the charging process, the algorithm turns to the Hand-held state and aborts the charging process.

The charge-only mode is entered when the phone is powered up by connecting a charger to the phone or when the phone is powered down while a charger is connected. In the charge-only mode, the transceiver unit is Off and the keypad is disabled. The battery charging process is the only function activated. The charging control software is a unified function designed for both normal and charge-only modes.

When connecting with a charger, a phone can be switched between the normal mode and the charge-only mode by pressing the <END> key. During a mode transition, the charging process is smoothly moved from the present operating mode to another mode. Some charging status are preserved to continue the charging process. The charging cycle will not restart when the phone is reset due to the operating modes switching. This design is also applicable to a situation as a phone is restarted (warm start or reboot) by software.

Since the charge current is time varying, the current required to charge the battery or to supply the phone must be modulated all the time as well. The modulation generates a duty-cycle that is a percentage of a regular time period such that the average current over this time period is equal to the preferred charge current. The duty-cycle is a variable whose value depends on not only the amount of the charge current and the required current, but also many other parameters, such as charge states, battery voltage, transmitter ON/OFF and its power levels, and backlight ON/OFF selections. In this context:

$$\text{Duty-cycle} = (I_{out-des}/I_{input}) \times T_p \quad (6)$$

where $T_p$ is the regular time period (5 seconds), $I_{input}$ is the averaged charge current from a charger, and $I_{out-des}$ is the required current for charging the battery or supplying the phone current.

To charge a battery, the duty-cycle is a function of $I_{input}$ and the battery charging current $I_{battery}$.

$$\text{Duty-cycle} = (I_{battery}/I_{input}) \times T_p \quad (7)$$

To supply the phone current, the duty-cycle is a function of $I_{input}$ and the phone current $I_{phone}$. An additional 10% of the duty-cycle is provided for charging efficiency, such that:

$$\text{Duty-cycle} = (I_{phone}/I_{input}) \times T_p \times 100\% \quad (8)$$

If a backlight is ON, the duty-cycle is compensated by the backlight current $I_{backlight}$, and:

$$\text{Duty-cycle} = ((I_{battery} + I_{backlight})/I_{input}) \times T_p \quad (9)$$

or $$\text{Duty-cycle} = ((I_{phone} + I_{backlight})/I_{input}) \times T_p \times 110\% \quad (10)$$

The duty-cycle is set to zero if the transmitter is ON and the battery voltage is above 5.3V, or the phone is accessing the system or scanning channels and the battery voltage is about 4.5V. If the transmitter is ON and the battery voltage is below 4.5V, the duty-cycle is calculated using equation (7).

In the CHARGING state, if all the charging requirements checked in the AWAIT state are satisfied, the charge current is applied to the battery until a battery-full state is determined. Since no thermistor is built in the batteries, the battery full detection is based on voltage reading only. An averaged voltage $V_{MEAN}$ is calculated and checked every minute by comparing the new voltage reading with the previous one. If the charging curve is increasing, a maximum reading $V_{MEAN\ MAX}$ is updated by the new reading $V_{MEAN}$. Otherwise, the battery full determination is activated if $V_{MEAN\ MAX}$ has been above the battery full level. The methods described below are used to determine if a battery is full.

(1) Minus delta V detection

The battery has been fully charged if the battery voltage, $V_{MEAN}$, is two A/D reading (corresponding to about 28 mV) less than the maximum reading, $V_{MEAN\ MAX}$, for two consecutive cycles.

(2) Peak voltage detection

The charging is complete if the battery voltage, $V_{MEAN}$, is less than or equal to the maximum reading, $V_{MEAN\ MAX}$, for ten minutes.

(3) Maximum voltage limit

The charging stops if the maximum voltage reading, $V_{MEAN\ MAX}$, reaches or exceeds the maximum level of battery voltage.

(4) Safety timer limit

The charging is terminated if it reaches maximum charge time. This timer is active when the battery is actually being charged.

With a standard charger, the varying charge current also causes battery voltage variation. The voltage cannot be measured by reading the A/D converter directly. The voltage measurement is activated every 5 seconds while the ICTRL is OFF. The voltage is sampled after setting the ICTRL OFF for 100 ms, and a new average voltage is a mean value of the new sample and the previous average voltage.

Without a build-in thermistor, the battery temperature is referred to the phone internal temperature provided by the oscillator thermistor. Since the actual battery temperature cannot be accurately measured by the thermistor, it is used as a reference of the phone ambient temperature during the charging process. The battery will not be charged if the temperature is out of a specific range. The temperature is checked once a second and averaged using a filtering average by adding the new temperature reading and the previous average temperature value together with weight 1/8 and 7/8 respectively. The temperature limits are required for the entire charging process.

In accordance with the present invention, a power unit and method are provided for operating an electrical apparatus and charging an apparatus battery regardless of whether the current source is constant or time varying. Thus, a less expensive charger, such as the standard charger, which supplies a time varying current as mentioned above, can be implemented, reducing overall product cost. Moreover, smoother current averages and thus more effective charging are achieved by utilizing an adjustable time period for current averaging.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of operating a battery powered electrical apparatus with a current source, wherein the current source is one of a constant current source and a time varying current source, the method comprising:

(a) measuring an input current ($I_{input}$) from the current source;

(b) selecting a desired output current ($I_{out-des}$) in accordance with predetermined operating parameters;

(c) determining a duty cycle in accordance with $I_{input}$ and $I_{out-des}$; and (d) supplying power ($I_{output}$) to the electrical apparatus in accordance with the duty cycle.

2. A method according to claim 1, wherein step (b) is practiced by selecting $I_{out-des}$ in accordance with a battery charging operation, and wherein step (d) is practiced by supplying power to charge the battery.

3. A method according to claim 1, wherein the duty cycle is a product of a duty percentage and a time period, and wherein step (c) is practiced by varying the duty percentage over the time period.

4. A method according to claim 1, wherein the duty cycle is a product of a duty percentage and a time period, and the time period is a function of ($I_{input}-I_{out-des}$) wherein step (c) is practiced by varying the time period.

5. A method according to claim 1, wherein step (b) is practiced by determining whether the battery needs charging, and if the battery needs charging, setting $I_{out-des}$ to a battery charging current ($I_{battery}$).

6. A method according to claim 5, wherein if the battery does not need charging, step (b) is practiced by setting $I_{out-des}$ to a device operating current ($I_{device}$).

7. A power unit for a battery powered electrical apparatus, the power unit being coupleable to one of a constant current source and a time varying current source, the power unit comprising:

an A/D converter that monitors an input current ($I_{input}$) from the current source;

a memory storing desired output currents ($I_{out-des}$) corresponding to predetermined operating parameters; and a controller communicating with said A/D converter and said memory, said controller selecting $I_{out-des}$ based on said predetermined operating parameters and determining a duty percentage in accordance with $I_{input}$ and $I_{out-des}$, wherein said controller drives the input current ($I_{input}$) to the electrical apparatus in accordance with the duty cycle.

8. A power unit according to claim 7, further comprising a rechargeable battery coupled with the electrical apparatus for powering the electrical apparatus when the current source is disconnected.

9. A power unit according to claim 8, further comprising a charging switch communicating with said controller, said controller closing said charging switch to charge said battery in accordance with one of said predetermined parameters.

10. A power unit according to claim 7, wherein said predetermined parameters comprise at least a charging mode and a device operating mode.

11. A power unit according to claim 10, wherein when said device is in said charging mode, said controller sets $I_{out-des}$ to a battery charging current ($I_{battery}$).

12. A power unit according to claim 10, wherein when said device is in said device operating mode, said controller sets $I_{out-des}$ to a device operating current ($I_{device}$).

* * * * *